(12) United States Patent
Hernandez Mascarell et al.

(10) Patent No.: US 9,523,352 B2
(45) Date of Patent: Dec. 20, 2016

(54) METHODS AND SYSTEMS FOR ALLEVIATING THE LOADS GENERATED IN WIND TURBINES BY WIND ASYMMETRIES

(75) Inventors: Octavio Hernandez Mascarell, Madrid (ES); Carlos Pizarro de la Fuente, Madrid (ES); Jaime Suarez Aizpun, Madrid (ES); Jorn Klaas Gruber, Madrid (ES)

(73) Assignee: GAMESA INNOVATION & TECHNOLOGY, S.L., Sarriguren (Navarra) (ES)

(*) Notice: Subject to any disclaimer, the term of this patent is extended or adjusted under 35 U.S.C. 154(b) by 1034 days.

(21) Appl. No.: 13/417,693

(22) Filed: Mar. 12, 2012

(65) Prior Publication Data
US 2012/0237346 A1   Sep. 20, 2012

(30) Foreign Application Priority Data
Mar. 17, 2011   (ES) .................... 201100307

(51) Int. Cl.
  *F03D 7/00* (2006.01)
  *F03D 7/04* (2006.01)
  *F03D 7/02* (2006.01)

(52) U.S. Cl.
  CPC .............. *F03D 7/043* (2013.01); *F03D 7/024* (2013.01); *F03D 7/0224* (2013.01); *F03D 7/0296* (2013.01); *Y02E 10/723* (2013.01)

(58) Field of Classification Search
  CPC ...... F03D 7/043; F03D 7/0296; F03D 7/0244; F03D 7/022; F03D 7/045
  USPC ......... 416/1, 27, 61, 104; 700/287–290, 202
  See application file for complete search history.

(56) References Cited

U.S. PATENT DOCUMENTS

2006/0002792 A1   1/2006   Moroz et al.
2007/0041837 A1*  2/2007   Ide et al. ................ 416/147

* cited by examiner

*Primary Examiner* — Eric Keasel
*Assistant Examiner* — Maxime Adjagbe
(74) *Attorney, Agent, or Firm* — Ladas & Parry LLP

(57) ABSTRACT

A method for alleviating rotor asymmetric loads in a variable-speed wind turbine having pitch and torque control means comprising the following steps: providing a control law that determines the pitch to be applied individually to each wind turbine blade for counteracting rotor asymmetric loads (such as wind shear, upflow, yaw misalignment) using wind speed and wind direction measurements at the wind turbine, values of the wind features that cause rotor asymmetric loads and configuration parameters of the wind turbine (whether real-time values or statistical values at the wind turbine site), said pitch to be added to the collective pitch $\theta_0$; implementing said control law in the wind turbine control means. The invention also refers to a wind turbine control system arranged for implementing said method.

15 Claims, 2 Drawing Sheets

METHODS AND SYSTEMS FOR ALLEVIATING THE LOADS GENERATED IN WIND TURBINES BY WIND ASYMMETRIES

CROSS REFERENCE TO THE CORRESPONDING APPLICATION

This application claims the benefit of Spanish Patent Application No. P201100307 filed on Mar. 17, 2011, the contents of which are incorporated herein by reference.

FIELD OF THE INVENTION

The invention relates to methods and systems for alleviating the loads generated in wind turbines by wind asymmetries and more in particular to methods and systems without measuring said loads.

BACKGROUND

Wind asymmetries such as wind shear, upflow and yaw misalignment produce asymmetric loads on the wind turbine blades that involve, on one side, extreme loads and, on the other side, fatigue that can lead to damages in the blades and other wind turbine components.

For reducing said damaging effects, the prior art teaches the use of an individual pitch control added to the collective pitch control and also yaw control. The pitch and/or yaw commands for reducing said asymmetric loads are calculated using measurements of said loads or of displacements caused by them.

An example of this prior art can be found in US 2006/002792 where a method for reducing loads and providing yaw alignment in a wind turbine includes measuring displacements or moments resulting from asymmetric loads on the wind turbine. These measured displacements or moments are used to determine a pitch for each rotor blade to reduce or counteract asymmetric rotor loading and a favourable yaw orientation to reduce pitch activity. Yaw alignment of the wind turbine is adjusted in accordance with the favourable yaw orientation and the pitch of each rotor blade is adjusted in accordance with the determined pitch to reduce or counteract asymmetric rotor loading. As pitch control is relatively faster than yaw control it is generally more actively used for asymmetric load reduction than yaw alignment.

Such an individual pitch control derived from measurements of the effects of asymmetric loads has however the following drawbacks, particularly when it shall be installed in wind turbines already in operation:

- a large increase in pitch actuation, implying a lower life in the pitch bearings;
- it may need modifications in some wind turbine subsystems (hydraulic group and refrigeration);
- the installation of the apparatus needed for measuring loads and/or displacements implies a high costs.

The present invention focuses on finding a solution for these drawbacks.

SUMMARY OF THE INVENTION

It is an object of the present invention to provide methods and systems for alleviating the loads generated in wind turbines by wind asymmetries without measuring directly or indirectly said loads.

It is another object of the present invention to provide methods and systems for alleviating the loads generated in wind turbines by wind asymmetries that can be implemented in already operating wind turbines.

In one aspect these and another objects are met by a method for alleviating rotor asymmetric loads in a variable-speed wind turbine having pitch and torque control means comprising the following steps:

providing a control law that determines the pitch to be applied individually to each wind turbine blade for counteracting rotor asymmetric loads using wind speed and wind direction measurements at the wind turbine, values of the wind features that cause rotor asymmetric loads and configuration parameters of the wind turbine, said pitch to be added to the collective pitch $\theta_0$;

implementing said control law in the wind turbine control means.

In embodiment of the present invention said wind features that cause rotor asymmetric loads include at least one of the following: wind shear, upflow and yaw misalignment (a yaw misalignment smaller than the operating limit of the yaw control system). The primary drivers of rotor asymmetric loads are therefore taken into account.

In embodiments of the present invention, said control law includes a periodic sinusoidal function $\theta_s \sin \psi$ and a periodic cosinusoidal function $\theta_c \cos \psi$ for counteracting the aerodynamic effects of upflow, yaw misalignment and wind shear as well as the rotor weight, said periodic functions having the same frequency than the rotor frequency. Therefore it is provided a 1P control law adapted to the main drivers of rotor asymmetric loads that can counteract a significant proportion of its effects.

In embodiments of the present invention, said control law also includes a periodic function having a frequency two times the rotor frequency for counteracting 3P oscillations in the non-rotating frame of the wind turbine. Therefore it is provided a 1P+2P control law adapted to the main drivers of rotor asymmetric loads that can counteract a great proportion of its effects.

In embodiments of the present invention the values $\alpha$, $\gamma_z$ of, respectively, wind shear and upflow are real-time values determined using wind data available at the wind turbine. Therefore it is provided an efficient method for alleviating the loads generated in wind turbines by wind asymmetries without using direct or indirect measurements of said loads.

In embodiments of the present invention, the values $\alpha$, $\gamma_z$ of, respectively, wind shear and upflow are statistical values at the wind turbine site. Therefore it is provided a method for alleviating the loads generated in wind turbines by wind asymmetries that can be installed in a great number of operating wind turbines without any hardware modification and that can achieve a substantial reduction of said loads.

In embodiments of the present invention, the coefficients $\theta_s$, $\theta_c$ of said control law are obtained using the linearized flapping equation of motion and Coleman transformation. Therefore it is provided an efficient method for the calculation of said coefficients $\theta_s$, $\theta_c$.

In another aspect, the above mentioned objects are met by a wind turbine control system connected to measuring devices of, at least, wind speed V and wind direction, generator speed $\Omega$, pitch angle $\theta$ of each blade, power P, azimuth position of the wind turbine blades $\psi$ and to, at least, pitch and torque control actuators; the wind turbine control system being arranged for performing a regulation of the wind turbine according to a predetermined power curve for wind speeds below the cut-out wind speed $V_{out}$; the wind turbine control system being also arranged for performing an individual pitch regulation of each blade adding to the collective pitch $\theta_0$ a pitch determined by a control law implemented in a control unit of the control system for counteracting rotor asymmetric loads using wind speed and wind direction measurements at the wind turbine, values of the wind features that cause rotor asymmetric loads and configuration parameters of the wind turbine.

In embodiments of the present invention, the control law implemented in the wind turbine control system may be a control law according to any of the above-mentioned method embodiments.

A wind turbine comprising the above-mentioned control system is also covered by the scope of the present invention.

Other features and advantages of the present invention will be understood from the following detailed description of illustrative and by no means limiting embodiments of its object in relation with the enclosed drawings.

DETAILED DESCRIPTION OF PREFERRED EMBODIMENTS

Figure 1:
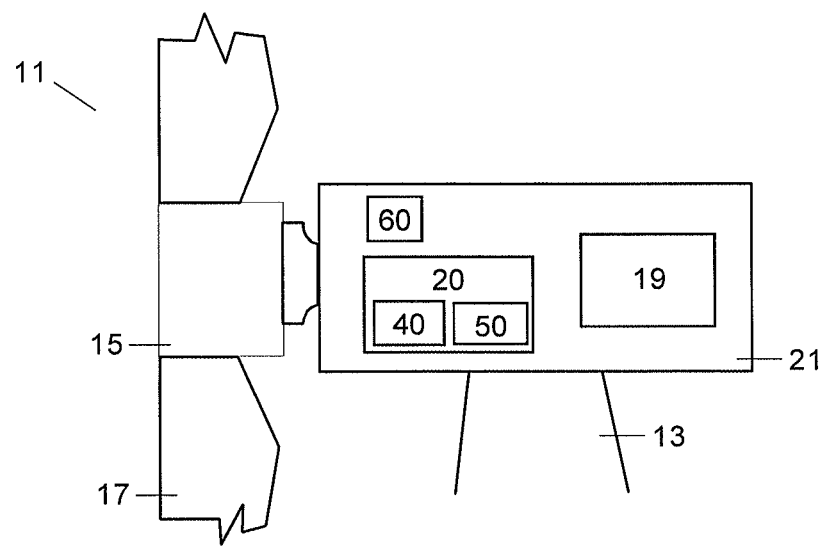
FIG. 1 is a schematic section side view of a wind turbine.

A typical wind turbine 11 comprises a tower 13 supporting a nacelle 21 housing a generator 19 for converting the rotational energy of the wind turbine rotor into electrical energy. The wind turbine rotor comprises a rotor hub 15 and, typically, three blades 17. The rotor hub 15 is connected either directly or through a gearbox to the generator 19 of the wind turbine for transferring the torque generated by the rotor 15 to the generator 19 and increase the shaft speed in order to achieve a suitable rotational speed of the generator rotor.

The wind turbine power output is typically controlled by means of a control system (20) for regulating the pitch angle of the rotor blades and the generator torque. The rotor rotational speed and power output of the wind turbine can hereby be initially controlled.

Figure 2:
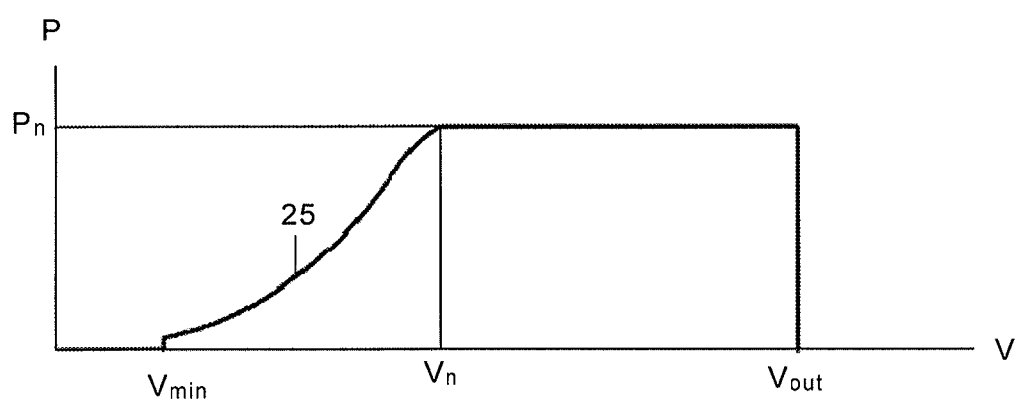
FIG. 2 shows a typical power curve of a wind turbine.

Below the cut-out wind speed $V_{out}$ the wind turbine control system is arranged to regulate the power production according to a curve which defines the desired functional relationship between power and speed to achieve ideal output. A curve of this type is curve 25 in FIG. 2 showing that the power production P increases from a minimum wind speed $V_{min}$ to the nominal wind speed $V_n$ and then remain constant in the nominal power value $P_n$ up to the cut-out wind speed $V_{out}$ where decreases up to 0.

For implementing said regulation a control unit (40) receives input data such as wind speed V, generator speed Q, pitch angle B, power P from well known measuring devices (60) and send output data to, respectively, pitch and torque control actuators (50) for changing the angular position of the blades 17 and to a generator command unit for changing the reference for the power production.

According to the present invention the control system is also arranged for applying an individual pitch control for reducing the asymmetric loads that does not use any measurement of the forces or moments acting on the wind turbine. This individual pitch control is superimposed to the conventional pitch control used for regulating the power production according to the power curve 25 of FIG. 2.

The basic ideas of the invention are the following:

Determining the asymmetric loads using wind data as well as physical features of the wind turbine such as the position of the first bearing of the low speed shaft (for determining for example loads due to the rotor weight). Therefore for the determination of the asymmetric loads it is not used any measurement of its effects in the blades or any other component of the wind turbine, such as for example the bending moment on the root of the blades or the deflection of the low speed shaft.

Figure 3:
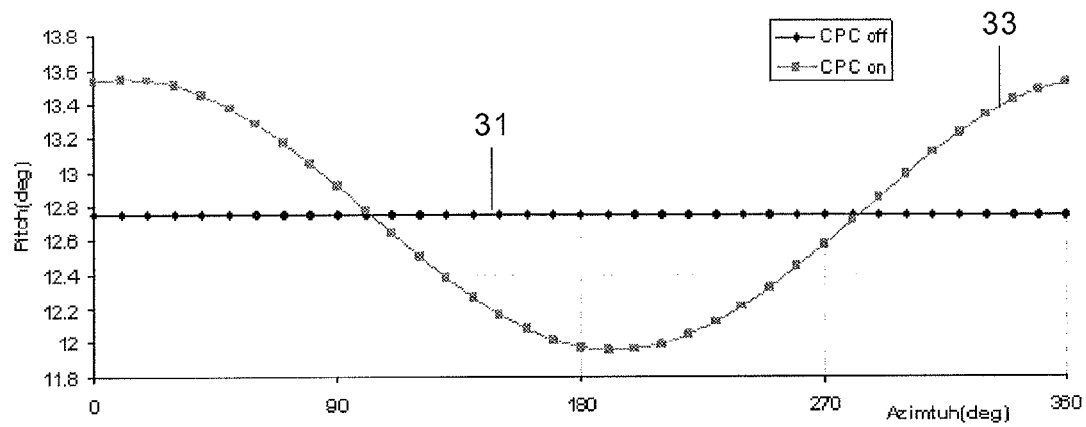
FIG. 3 is a diagram showing the pitch command of the collective pitch regulation and the pitch command resulting of adding a cyclic regulation in a revolution of a wind turbine blade according to the present invention.

Providing a control law defining a cyclic pitch control for each individual blade that counteracts the effect of the considered drivers of asymmetric loads. An example of a control law according to the present invention is illustrated in FIG. 3. The line 31 represents the collective pitch applied to all the blades, i.e. a constant pitch along one blade revolution, and the line 33 represents a periodic pitch applied to one blade along a blade revolution resulting of adding the pitch according to said control law to the collective pitch.

Implementing said control law in the wind turbine control means.

A further explanation of the invention follows.

Asymmetric Loads

The drivers of asymmetric loads considered in the present invention are the following:

Wind shear which can be defined by a statistical value at the wind turbine site (for example a wind shear coefficient α of 0.2) or by a real-time value determined using wind data available at the wind turbine. If needed the statistical mean value can be changed for a better adaptation to the wind conditions at the wind turbine site.

Upflow which can be defined by a statistical value at the wind turbine site (for example $\gamma_z=8$ degrees) or by a real-time value determined using wind data available at the wind turbine. If needed the statistical mean value can be changed for a better adaptation to the wind conditions at the wind turbine site.

Yaw misalignment. Within the meaning of this invention yaw misalignment $\gamma_y$ shall be understood as a misalignment smaller than the operating limit of the yaw control system. It is measured from the wind vane available at the wind turbine.

Rotor weight. The self-weight of the rotor is a constant contribution acting on the fixed frame of reference, loading the structure with a constant valued moment. When the rotating frame is analyzed, this contribution is transformed into a fluctuation with frequency 1P (one rotor revolution), that generates a high level of fatigue, for example on the shaft. A cyclic pitch action can cancel out the effect of the self-weight by adding the corresponding aerodynamic counter-moment.

Control Law

The basic control law according to the present invention is the cyclic law included in the following equation:

The basic control law according to the present invention is the cyclic law included in the following equation:

$$\theta = \theta_0 + \theta_c \cos \psi + \theta_s \sin \psi \qquad \text{Eq. 1}$$

The pitch θ applied to any of the blades is therefore the sum of the collective pitch contribution $\theta_0$, plus a cyclic contribution on the instantaneous azimuth position $\psi$ defined by the cosine and sine parameters $\theta_c$ and $\theta_s$ respectively.

Using the following notation:
$\theta_0$ Collective pitch command
$\Omega$ Rotor Speed
V Wind Speed
$\alpha$ Wind Shear
$\gamma_y$ Yaw Misalignment
$\gamma_z$ Upflow an algebraic relationship between said parameters $\theta_c$ and $\theta_s$ and the current operating conditions at the wind turbine—including external wind conditions—can be defined as follows:

$$\left\{\begin{array}{c}\theta_c \\ \theta_s\end{array}\right\} = -\left\{\begin{array}{c}f_c(\theta_0, \lambda; \alpha, \gamma_y, \gamma_z; \dots) \\ f_s(\theta_0, \lambda; \alpha, \gamma_y, \gamma_z; \dots)\end{array}\right\} \qquad \text{Eq. 2}$$

In an embodiment of the present invention said algebraic relationship can be derived employing the linearized flapping equation of motion and Coleman transformation. In this case, three equations are obtained for the out of plane bending moment (constant contribution, cosine fluctuation and sine fluctuation). By cancelling out the cosine and sine like fluctuations, or alternatively equating them to a prescribed value—e.g. for the cancellation of the rotor self-weight—the corresponding cyclic loads are obtained.

The control law is derived from the flapping equation of motion for one blade:

$$I\Omega^2(\ddot{\zeta}+v^2\zeta)=(M_0+M_\zeta\zeta+M_{\dot\zeta}\dot\zeta+M_\theta\theta+M_\lambda\lambda+\lambda M_\alpha\alpha) \qquad \text{Eq. 3}$$

where
I Flapping inertia
$\zeta$ Flapping motion
$v$ Flapping motion eigen frequency
$M_0$ Constant flap bending moment
$M_x$ Derivative of flap bending moment with respect to variable x
$\alpha$ Wind shear
$\theta_0$ Collective pitch angle
$\lambda$ Tip Speed Ratio The contributions of all the blades are summed by use of the Coleman transformation and the cyclic contributions are set to zero. Using a linearized aerodynamic model, the following relations are obtained.

$$\left\{\begin{array}{c}\theta_c \\ \theta_s\end{array}\right\} = \qquad \text{Eq. 4}$$
$$-\frac{1}{M_\theta}\left[\frac{2}{3R}\frac{M_{rotor}gx}{I_\zeta\Omega^2}\left\{\begin{array}{c}-1\\N^*\end{array}\right\} + \left\{\begin{array}{c}\mu_y\\\mu_z\end{array}\right\}(M_0+M_\lambda\lambda+2T_\theta\theta_0) + \lambda\left\{\begin{array}{c}-\frac{R}{H}\alpha M_\theta\\0\end{array}\right\} + \left\{\begin{array}{c}-\mu_z\\\mu_y\end{array}\right\}M_{\zeta_0}\zeta_0\right]$$

where the effect of self-weight has been included, and the following parameters are employed:
Mrotor Rotor mass
g Gravity
x Desired shaft position for zero bending moment (x=0: hub center)
N* Phase Lag value (coupling originated by the precession terms)

$T_\theta$ Thrust derivative with respect to pitch
$M_\theta$ Out of plane bending moment derivative with respect to pitch
$M_\lambda$ Out of plane bending moment derivative with respect to tip speed ratio
R Rotor radius
H Tower height
$\zeta_0$ Average flap deflection
$\mu_y$ Lateral dimensionless wind speed=$\lambda$ tan(-wnddir)
$\lambda_z$ Vertical dimensionless wind speed=$\lambda$ tan(upflow)

In the case of the above mentioned FIG. 3 the control law corresponds to a typical wind turbine operating at a condition of a wind speed v=15 mps. The calculation has been performed for standard conditions (upflow $\gamma_z$=8 deg, wind shear $\alpha$=0.2, yaw misalignment $\gamma_y$=0 deg) and the results obtained using Eq. 4 were $\theta_c$=0.78 deg and $\theta_s$=0.17 deg. For steady operation the out of plane bending moment standard deviation is reduced to 40% of the case without the cyclic contribution.

In an embodiment of the present invention the control law includes additional terms in order to reduce the 3P oscillations in the non-rotating frame (which are counteracted by 2P oscillations in the rotating frame). In this case, the control law is the cyclic law included in the following equation:

$$\theta=\theta_0+\theta_c\cos\psi+\theta_s\sin\psi+\theta_{c3P}\cos 2\psi+\theta_{s3P}\sin 2\psi=\theta_0+(\theta_c+\theta_{c3P}\cos 3\psi+\theta_{s3P}\sin 3\psi)\cos\psi+(\theta_s+\theta_{c3P}\sin 3\psi-\theta_{s3P}\cos 3\psi)\sin\psi \qquad \text{Eq. 5}$$

Introducing this expression in the formulation, additional terms appear.

$$\frac{1}{8}\left\{\begin{array}{c}\theta_{c3P}\\\theta_{s3P}\end{array}\right\}=-\left\{\begin{array}{c}A+C\\B+D\end{array}\right\}$$

$$A=\frac{1}{6}(-\mu_z\theta_s+\mu_y\theta_c)$$

$$B=\frac{1}{6}(\mu_z\theta_c+\mu_y\theta_s)$$

$$C=\lambda\frac{R}{H}\alpha\frac{1}{12}\mu_y(-1)$$

$$D=\lambda\frac{R}{H}\alpha\frac{1}{12}\mu_z(-1)$$

Figure 4:
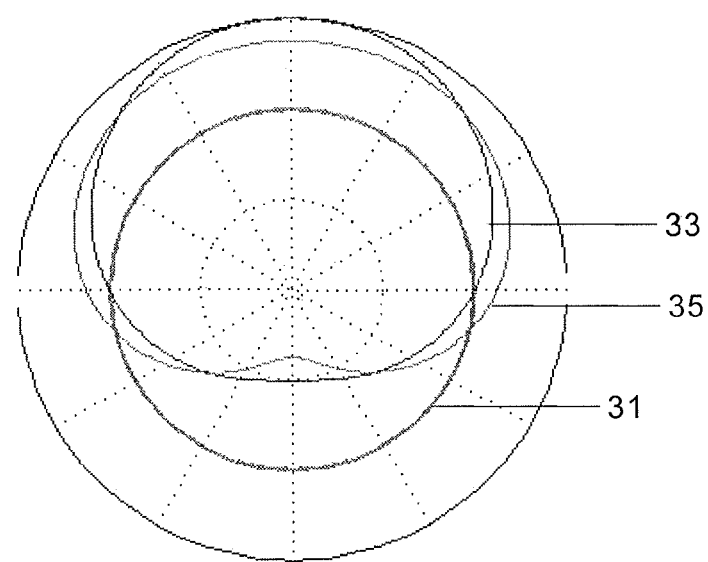
FIG. 4 is a polar diagram showing the pitch command of the collective pitch regulation and the pitch command resulting of adding a cyclic regulation according to two embodiments of the present invention in a revolution of a wind turbine blade.

FIG. 4 illustrates the two mentioned embodiments of the present invention: a control law with 1P functions (circle 33) and control law with 1P and 2P functions (circle 35). Both control laws are the result of adding a cyclic pitch to the collective pitch $\theta_0$ which is represented in circle 31 as a constant pitch along one blade revolution.

The difference between control laws 31 and 33 is that the first is a periodic function with a frequency equal to the rotor rotation frequency and the second superimposes on this basic law another contribution with a frequency equal to two times the rotor frequency, aimed at minimizing the loads transmitted at this frequency to the structure.

Implementation

The implementation of a control law according to this invention is done upon the typical wind turbine controller, including the additional pitch contribution after the collective signal generation is determined by the controller. The collective contribution is still the standard pitch reference for the controller regarding alarms and operation set points. The dependence of the control law with the operation region is provided to the controller as a function of the collective pitch angle. As it has already been said the environmental conditions are provided in terms of wind shear, upflow, wind speed and horizontal wind direction to the control unit where said additional pitch contribution is determined using the above-mentioned equations. The values of the inertial and aerodynamic terms associated to the wind turbine included in said equations are provided to said control unit by any suitable means.

The additional pitch action generated by a control law according to this invention may be restricted to certain limit values and operation regions in order to avoid potential performances degradation.

Advantages

The main advantages of the cyclic pitch control according to the present invention are the following:

- It provides a reduction of the damaging effects of asymmetric loads at a low cost because it does not require any hardware modification.
- It can be easily implemented in those wind turbines already in operation with individual pitch actuation systems but lacking an individual pitch action for counteracting asymmetric loads.
- It can be also implemented in those wind turbines provided with an individual pitch control system for asymmetric load reduction using load measurements to act as back-up system when said individual pitch control system is not operative due to, for example, failures in the load measuring devices. The wind turbine could then continue operating in a normal mode without a power reduction.

Of course the methods and systems according to this invention using wind standard conditions will not be as effective in the load alleviation as those methods and systems based on individual pitch control that use load measurements for calculating the individual pitch action but offers a potentially consistent reduction employing less pitch activity. Using real-time wind data the results will be comparable to load measuring methods.

Although the present invention has been fully described in connection with preferred embodiments, it is evident that modifications may be introduced within the scope thereof, not considering this as limited by these embodiments, but by the contents of the following claims.

The invention claimed is:

1. A method for alleviating rotor asymmetric loads in a variable-speed wind turbine-having pitch and torque control means comprising the following steps:
   - determining wind speed and wind direction from measuring devices on the wind turbine,
   - calculating wind shear, yaw misalignment, and upflow,
   - determining a pitch $\theta$ to be applied individually to each wind turbine blade for counteracting the rotor asymmetric loads, wherein $\theta$ is equal to $\theta_0 + \theta_c \cos \psi + \theta_s \sin \psi$, wherein $\theta_0$ is a conventional pitch of a wind turbine blade for regulating power production, $\psi$ is an azimuth position for the wind turbine blade, and parameters $\theta_c$ and $\theta_s$ are derived from the wind shear, yaw misalignment, and upflow, and
   - implementing said pitch $\theta$ in the wind turbine pitch and torque control means for providing a cyclic pitch control on each wind turbine blade for alleviating the rotor asymmetric loads,
   wherein the rotor asymmetric loads are alleviated without measuring directly or indirectly the rotor asymmetric loads.

2. The method according to claim 1, wherein the weight of the wind turbine rotor is included in the determination of the pitch $\theta$ for alleviating the rotor asymmetric loads.

3. The method according to claim 1, wherein
   said periodic functions $\theta_s \sin \psi$ and $\theta_c \cos \psi$ have a frequency that is equal to a frequency of a rotor of the wind turbine.

4. The method according to claim 3, wherein a periodic function having a frequency that is two times the rotor frequency of the wind turbine is used for calculating the pitch $\theta$ for counteracting 3P oscillations in a non-rotating frame of the wind turbine.

5. The method according to claim 1, wherein wind shear and upflow are real-time values determined using wind data available at the wind turbine.

6. The method according to claim 1, wherein wind shear and upflow are statistical values at the wind turbine site.

7. The method according to claim 1, wherein coefficients $\theta_s$, $\theta_c$ are obtained using a linearized flapping equation of motion and a Coleman transformation.

8. A wind turbine control system comprising:
   pitch and torque control actuators,
   measuring devices, and
   a control unit,
   wherein the measuring devices are configured to measure at least wind speed V, wind direction, generator speed $\Omega$, a conventional pitch angle $\theta_0$ of each wind turbine blade, power P, and an azimuth position $\psi$ of each wind turbine blade,
   wherein the control unit is configured to determine a pitch $\theta$ to be applied to a wind turbine blade for counteracting rotor asymmetric loads, wherein $\theta$ is equal to $\theta_0 + \theta_c \cos \psi + \theta_s \sin \psi$, wherein parameters $\theta_c$ and $\theta_s$ are derived from wind shear, yaw misalignment, and upflow, and
   wherein the control unit is configured to perform a regulation of the wind turbine according to a predetermined power curve for wind speeds below a cut-out wind speed $V_{out}$ while simultaneously performing an individual cyclic pitch regulation of each blade for alleviating rotor asymmetric loads without having to measure directly or indirectly the rotor asymmetric loads.

9. The wind turbine control system according to claim 8, wherein said control unit is configured to calculate at least one of the following: wind shear, upflow and yaw misalignment.

10. The wind turbine control system according to claim 8, wherein
    said periodic functions $\theta_s \sin \psi$ and $\theta_c \cos \psi$ have a frequency that is equal to a frequency of a rotor of the wind turbine.

11. The wind turbine control system according to claim 10, wherein a periodic function having a frequency that is two times the frequency of the rotor of the wind turbine is used for calculating the pitch $\theta$ for counteracting 3P oscillations in a non-rotating frame of the wind turbine.

12. The wind turbine control system according to claim 8, wherein wind shear and upflow are real-time values determined using wind data available at the wind turbine.

13. The wind turbine control system according to claim 8, wherein wind shear and upflow are statistical values at the wind turbine site.

14. The wind turbine control system according to claim 8, wherein coefficients $\theta_s$, $\theta_c$ are obtained using a linearized flapping equation of motion and a Coleman transformation.

15. A wind turbine comprising the control system according to claim 8.

* * * * *